May 18, 1965  J. D. RUHALA  3,184,270

HANDLE FASTENER

Filed March 20, 1963

INVENTOR.
Joseph D. Ruhala
BY
E. W. Christen
ATTORNEY 3,184,270
HANDLE FASTENER
Joseph D. Ruhala, Royal Oak, Mich., assignor to General Motors Corporation, Detroit, Mich., a corporation of Delaware
Filed Mar. 20, 1963, Ser. No. 266,529
2 Claims. (Cl. 306—41)

This invention relates to means for fastening an arm to a handle having a recess for receiving the arm.

Frequently in arrangements for fastening a steel arm or other arm of hard material with a handle of plastic or other softer material having a recess for receiving the arm, a plurality of barbs are formed on opposite sides of the arm. As the arm is inserted into the recess the barbs dig into opposing side walls thereof and lock the arm with the handle. However, in such arrangements, the barbs usually score the side walls as the arm is being inserted and, in many cases, only the cold flow of the plastic material behind the barbs acts to lock the arm with the handle. Since little backing is provided by the scored walls behind the barbs, it frequently occurs that the handle becomes disengaged from the arm.

In accordance with this invention, means are provided for locking a relatively torsionally rigid arm with a handle having a recess therein for receiving the arm without appreciably scoring the side walls of the recess in the manner of prior arrangements discussed above. This is accomplished with a pair of locking flanges protruding from opposite faces of one end of the arm from opposing sides of the longitudinal axis defined by the arm. The locking flanges protrude to the extent that they define an effective width which in a first position of the arm with respect to the recess permits insertion of the locking flanges in the recess without appreciably scoring opposing side walls thereof. However, the width defined when the arm is canted to a second position with respect to the recess is substantially greater than that of the recess whereby with the arm so received by the recess it will be locked with the handle. In addition, cam means project from the arm rearwardly of the barbs. Accordingly, when the locking flanged end is inserted into the recess with the arm initially in the first position the cam means cam against opposing side walls of the recess so as to cant the arm to the second position to cause the locking flanges to dig into the walls and thereby lock the arm with the handle.

A more complete understanding of the invention may be had from the detailed description which follows taken with the accompanying drawings in which.

Figure 3:
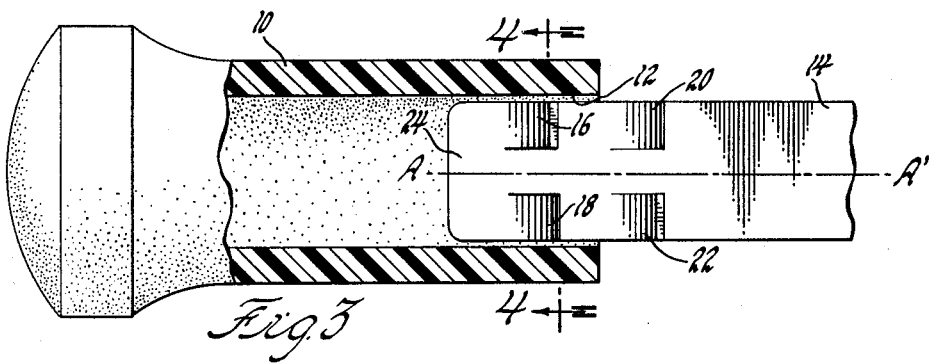
Figure 4:
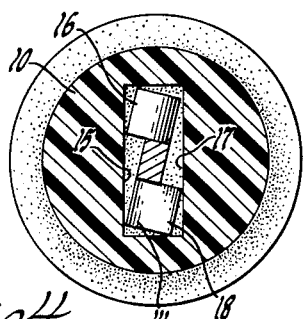

FIGURE 3 is a plan view partly in section illustrating the invention with only the locking flanges 16 and 18 received by the recess 12 in the handle 10; and FIGURE 4 is an end view taken along line 4—4 in FIGURE 3.

Figure 1:
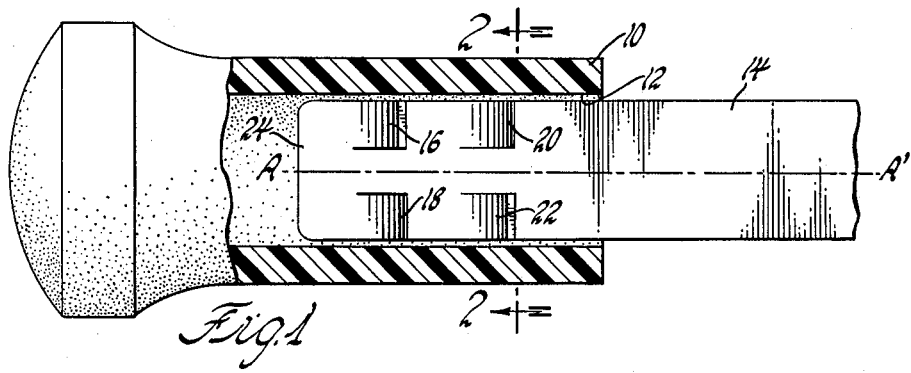
FIGURE 1 is a plan view partly in section illustrating the invention with the arm 14 locked with the handle 10.
Figure 2:
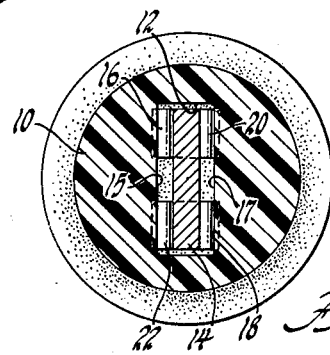
FIGURE 2 is an end view taken along line 2—2 in FIGURE 1.

Referring now to the drawings and more particularly to FIGURES 1 and 2, there is shown a handle 10 of plastic material having a recess 12 of rectangular cross-section formed in one end thereof and extending inwardly along the longitudinal axis of the handle. The recess 12 serves to receive a flat steel arm 14 of substantially uniform rectangular cross-section throughout its length. The arm 14 is provided with two pairs of rectangular barbs or flanges 16 and 18, and 20 and 22 respectively spaced longitudinally from an insert end 24 of the arm. The flanges of each pair of flanges are struck at points equidistant from the insert end 24 on opposite sides of a longitudinal axis A–A' defined by the arm 14 and are equally slanted outwardly from opposite faces of the arm in cantilever fashion with the free ends thereof directed rearwardly of the insert end 24. Furthermore, the flanges on each side of the longitudinal axis A–A', i.e., 16 and 20 and 18 and 22, respectively, also protrude from opposite faces of the arm. The flanges are all of equal length and the locking flanges 16 and 18 define an effective width less than that defined by opposing side walls 15 and 17 of the recess 12 when the arm 14 is in a first position with respect to the recess, as shown in FIGURE 4, and substantially greater thereof when the arm 14 is canted to a second position with respect to the recess, as shown in FIGURE 2.

The arm 14 is preferably constructed exhibiting a relatively torsionally rigid characteristic so that when the locking flanges 16 and 18 are in the first position and received by the recess 12, and if the other end of the arm is twisted about the longitudinal axis A–A' in a counterclockwise direction, as viewed in FIGURE 4, the locking flanges 16 and 18 will follow and respectively dig into the side walls 15 and 17.

During the fastening operation, the arm 14 is initially aligned in the first position with respect to the recess 12 so that as the insert end 24 is inserted into the recess to the extent as shown in FIGURE 3 the locking flanges 16 and 18 will not score the side walls 15 and 17, respectively. However, upon inserting the arm 14 further into the recess, the camming flanges 20 and 22 will initially serve as cam surfaces and will respectively cam against the side walls 17 and 15 causing the arm to rotate about the axis A–A' in a counterclockwise direction, as viewed in FIGURES 2 and 4. This will cause the free ends of the locking flanges 16 and 18 to respectively dig into the side walls 15 and 17 and lock the arm 14 with the handle 10. The free ends of camming flanges 20 and 22 will respectively dig into the side walls 17 and 15 and a backing will be created behind them due to an accompanying cold flow of the plastic material to further resist axial disengagement of the arm 14 from the handle 10.

Although the description of the invention has been given with respect to a particular embodiment, it is not to be construed in a limiting sense. Numerous variations and modifications within the spirit and scope of the invention will now occur to those skilled in the art. For a definition of the invention, reference is made to the appended claims.

I claim:
1. A handle fastener including:
a handle having a multi-sided recess therein;
a multi-sided arm adapted to be inserted into said recess in said handle in more than one position, said arm having a longitudinal axis;
and means to lock said arm within said recess in said handle comprising a pair of locking flanges extending outwardly from opposite faces of said arm and disposed one above and one below said axis, each of said flanges terminating in an outer sharp edge adapted to engage the handle within the recess, said edges being substantially in a plane drawn normal to said axis, a pair of camming flanges located at a position on said arm spaced axially thereof from said locking flanges and extending outwardly from opposite faces of said arm, disposed one below and one above said axis, each of said camming flanges terminating in a sharp outer edge adapted to engage the handle within the recess, said camming flange edges being substantially in a plane drawn normal to said axis, said camming flanges extending from diagonally opposite points of said opposite faces from which said locking flanges extend, the effective width of the arm including said locking flanges being less than that of the arm including all of said flanges when said arm is inserted into said recess in a first position such that the locking flanges due to their effective width do not engage said recess while the effectively wider camming flanges will so engage the recess and cant the arm about said axis to a second position with respect to the handle thereby twisting the locking flanges into the sides of said recess and locking said arm to said handle.

2. A handle fastener including:

a handle having a rectangular recess therein;

a rectangular arm adapted to be inserted into said recess in said handle in more than one position, said arm having a longitudinal axis;

and means to lock said arm within said recess in said handle comprising a pair of locking flanges extending outwardly from opposite faces of said arm and disposed one above and one below said axis, each of said flanges terminating in an outer sharp edge adapted to engage the handle within the recess, said edges being substantially in a plane drawn normal to said axis, a pair of camming flanges located at a position on said arm spaced axially thereof from said locking flanges and extending outwardly from opposite faces of said arm, disposed one below and one above said axis, each of said camming flanges terminating in a sharp outer edge adapted to engage the handle within the recess, said camming flange edges being substantially in a plane drawn normal to said axis, said camming flanges extending from diagonally opposite points of said opposite faces from which said locking flanges extend, the effective width of the arm including said locking flanges being less than that of the arm including all of said flanges when said arm is inserted into said recess in a first position such that the locking flanges due to their effective width do not engage said recess while the effectively wider camming flanges will so engage the recess and cant the arm about said axis to a second position with respect to the handle thereby twisting the locking flanges into the sides of said recess and locking said arm to said handle.

References Cited by the Examiner
UNITED STATES PATENTS
2,304,036  12/42  Tegarty _____ 16—121
FOREIGN PATENTS
524,207  11/52  Belgium.

CARL W. TOMLIN, *Primary Examiner.*